Aug. 14, 1923.
W. J. TOWLE
1,465,101
MACHINE FOR FORMING GASKETS AND APPLYING THE SAME TO CAN
ENDS OR OTHER CLOSURES
Filed Oct. 17, 1921
9 Sheets-Sheet 7

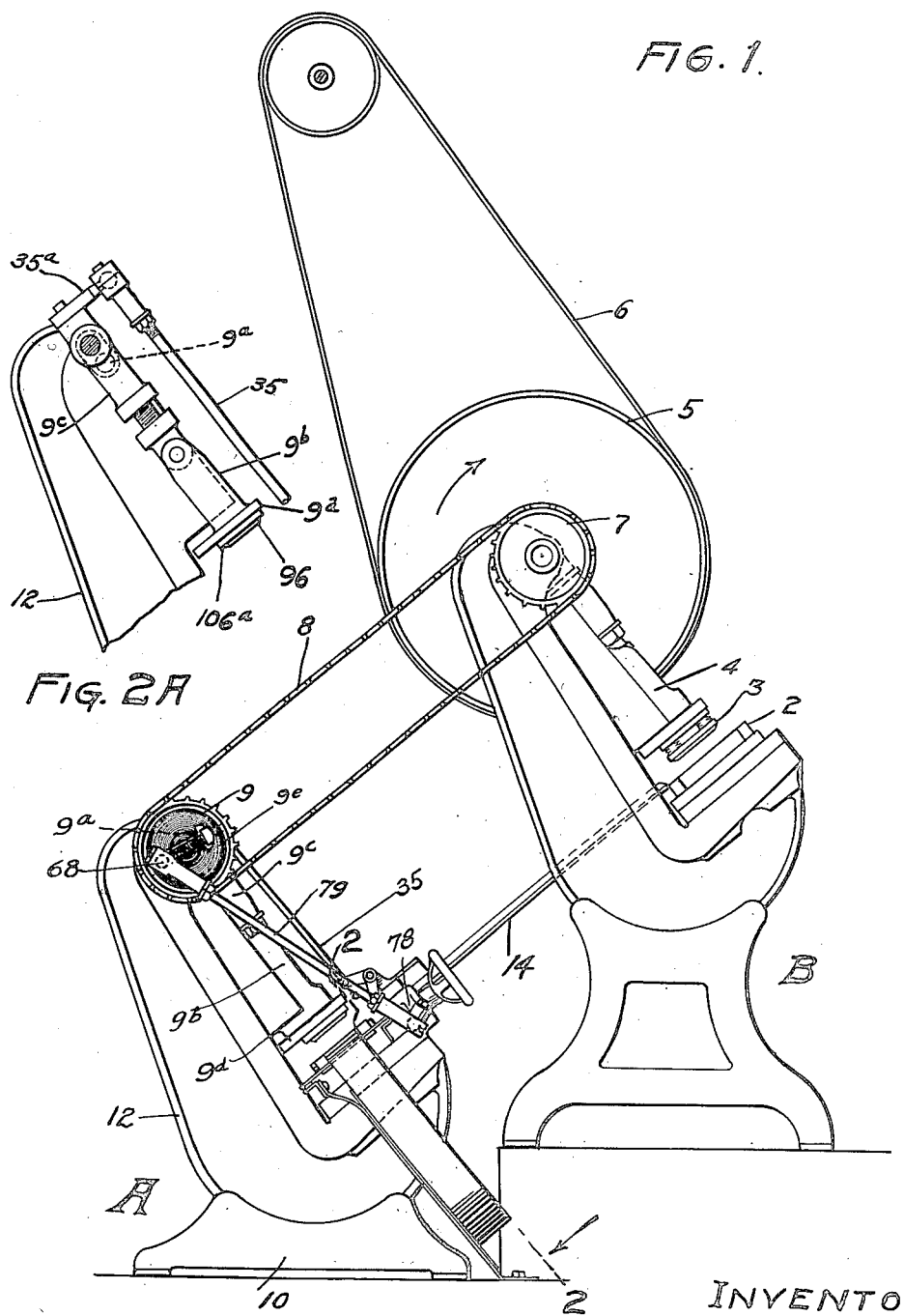

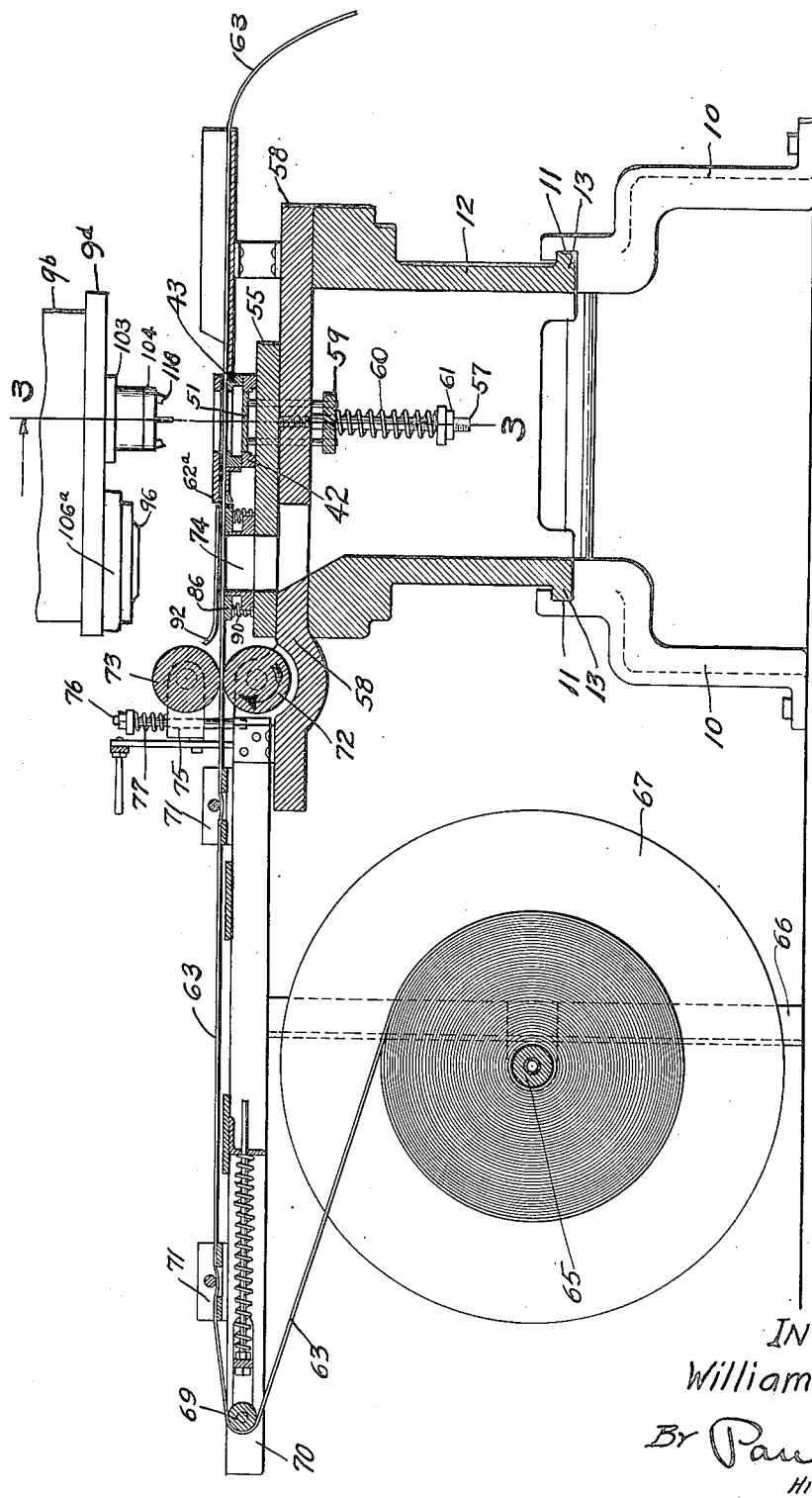

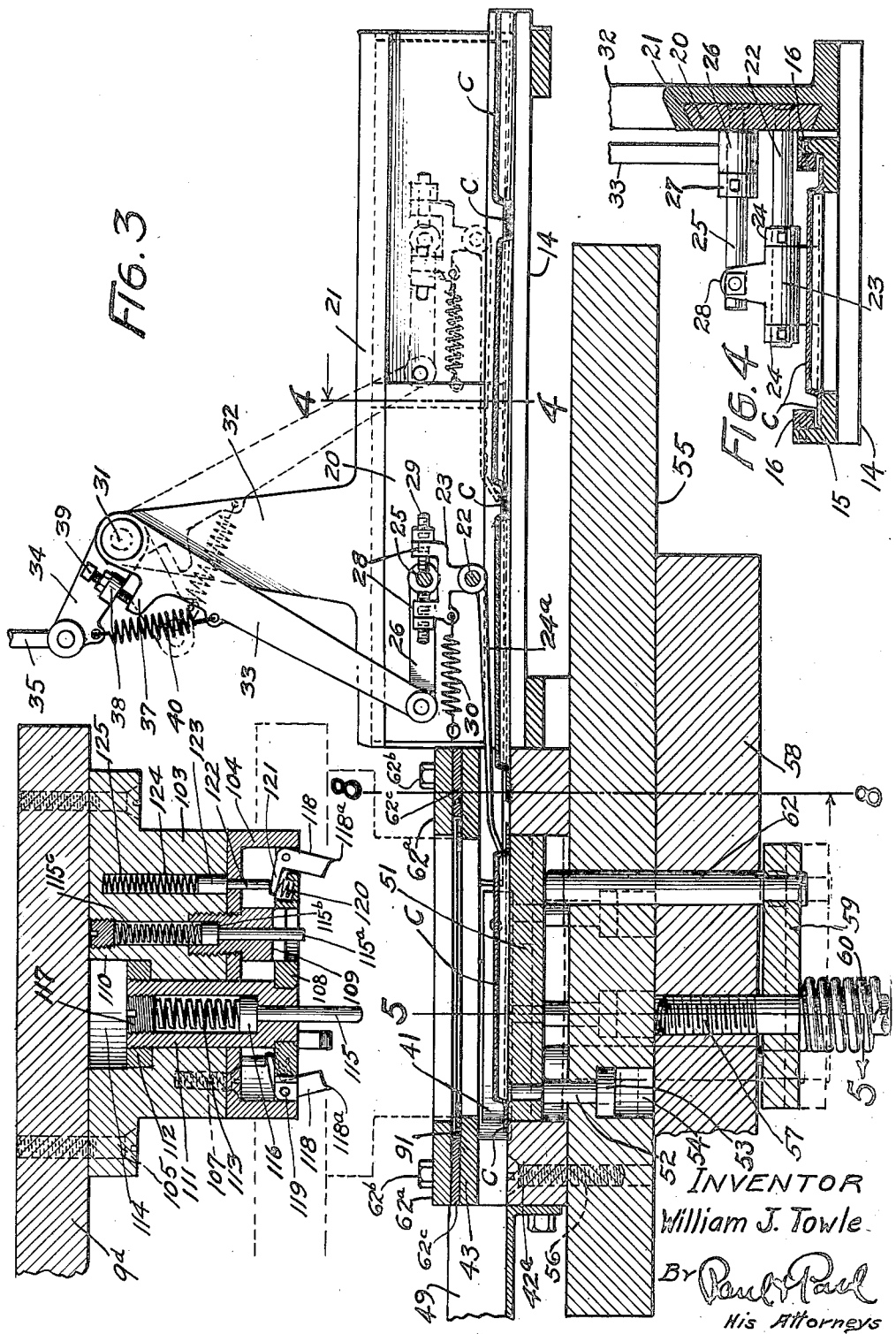

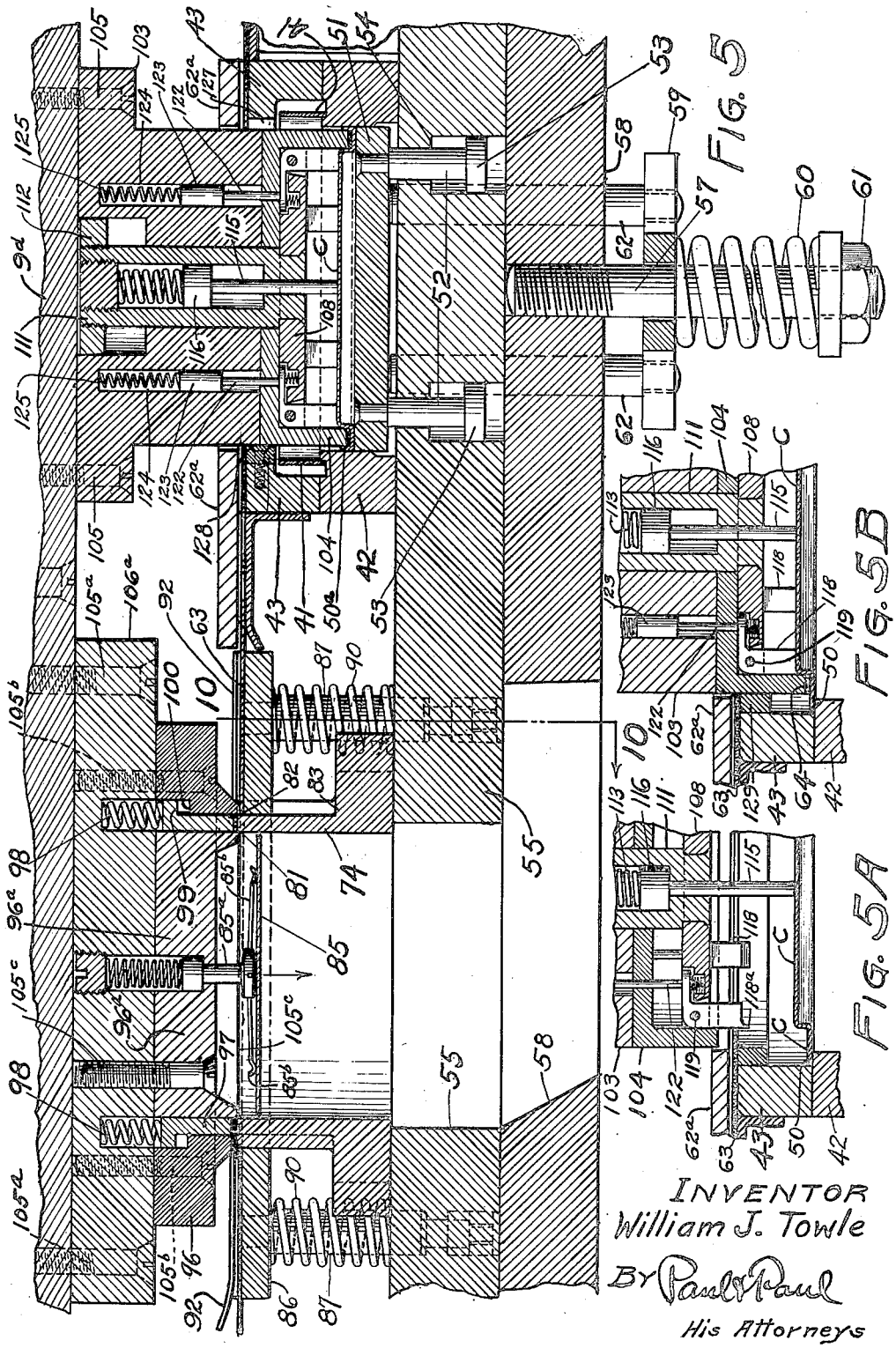

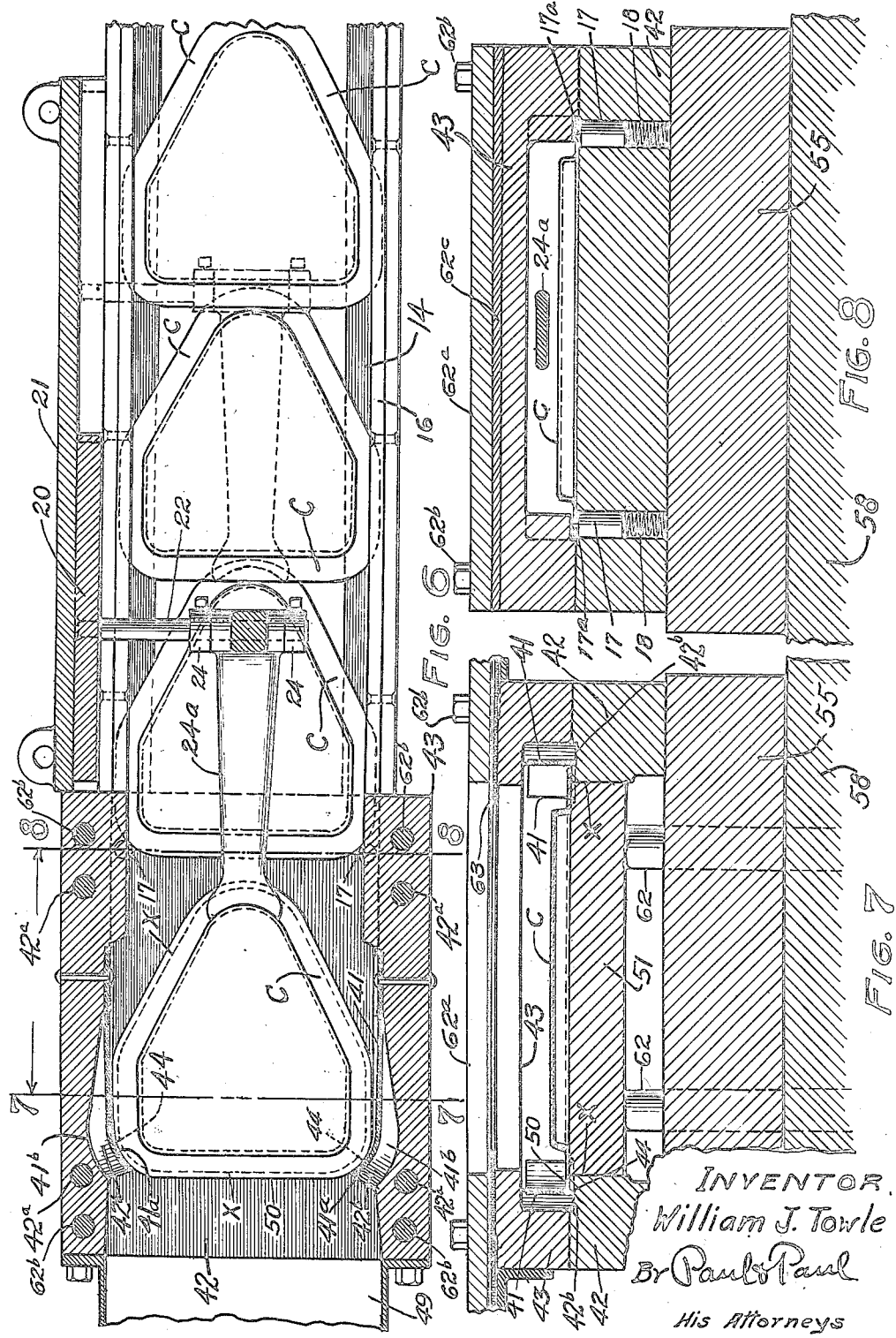

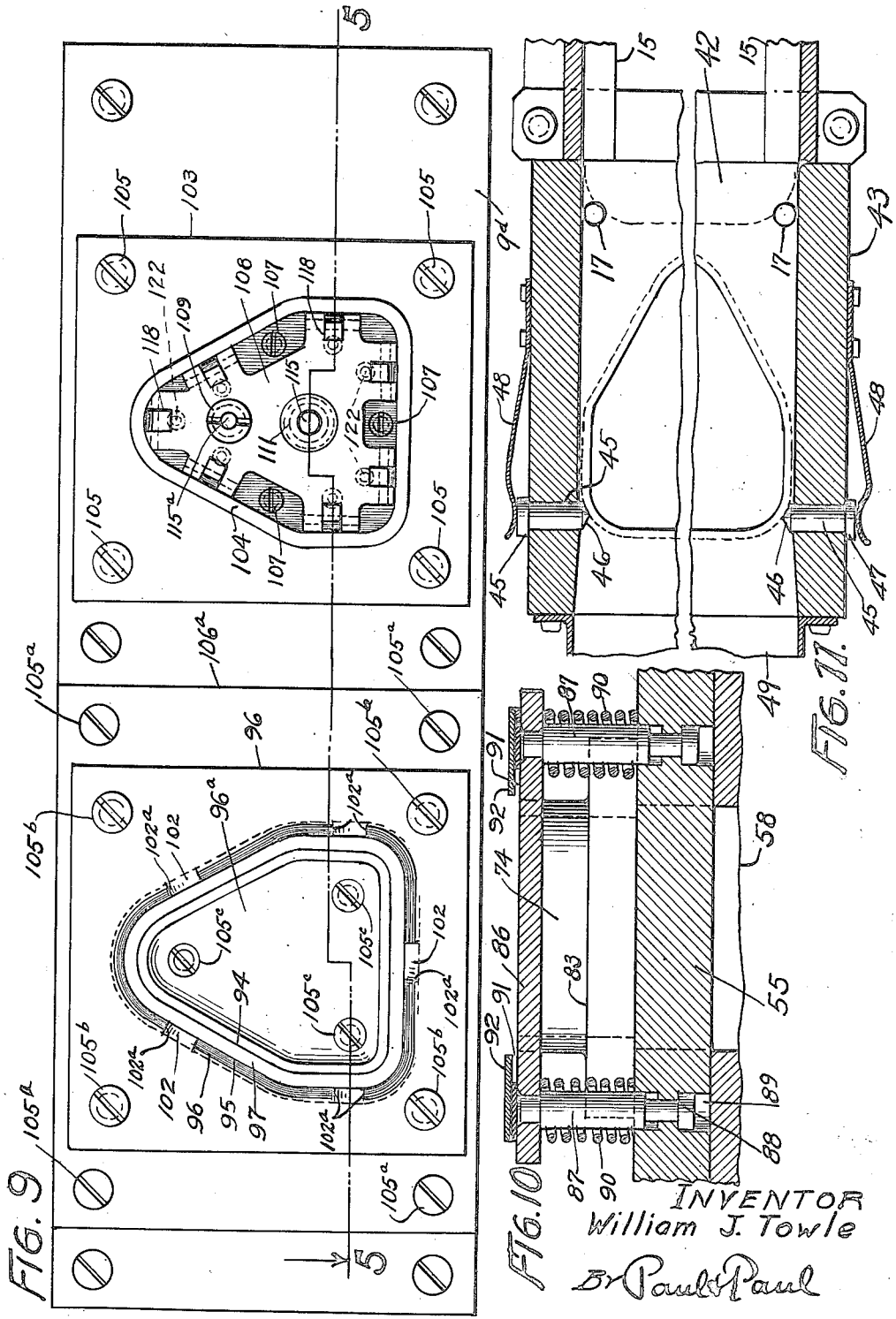

INVENTOR
William J. Towle
By Paul & Paul
His Attorneys

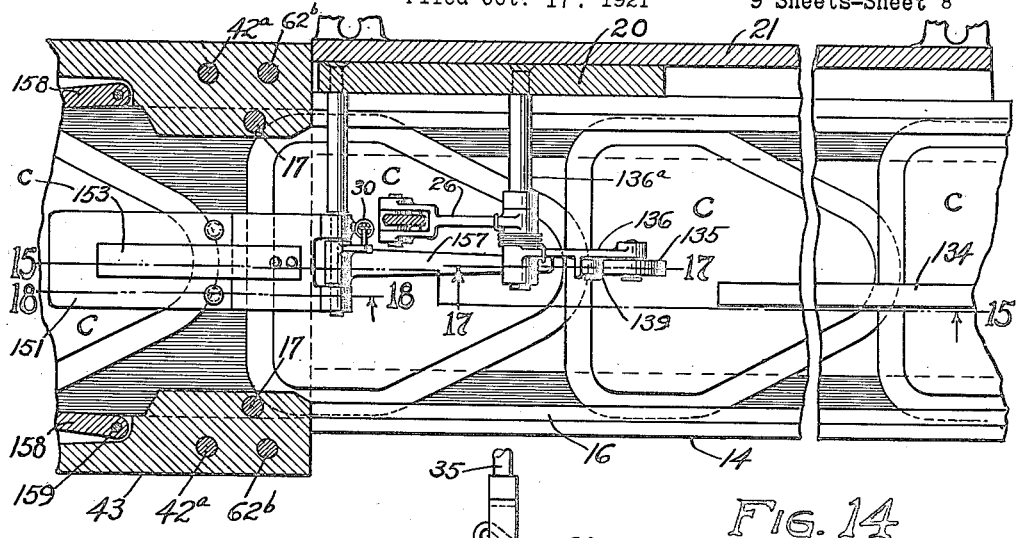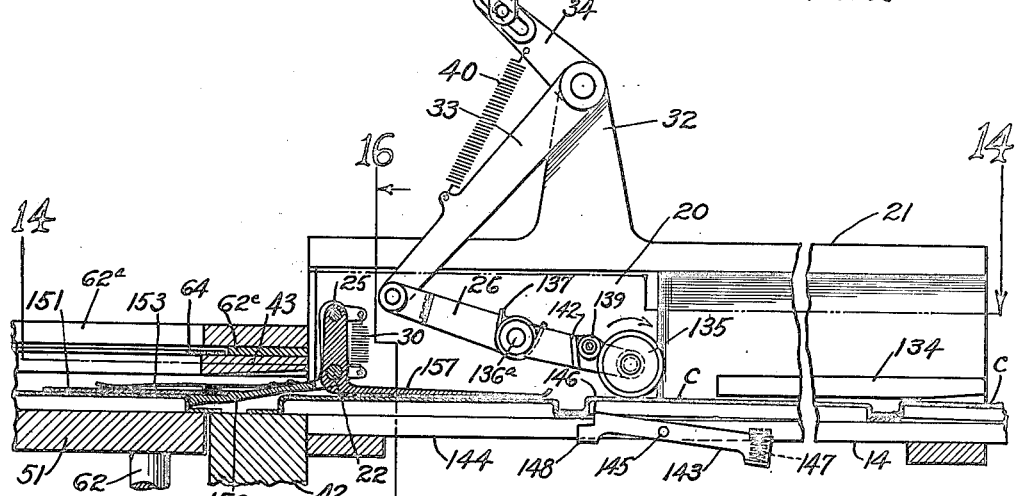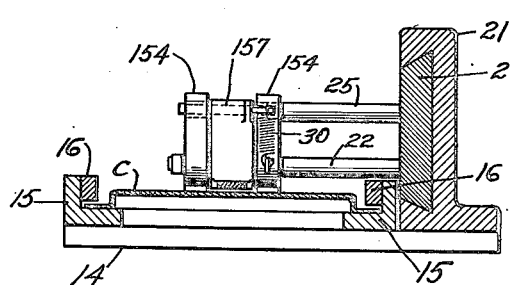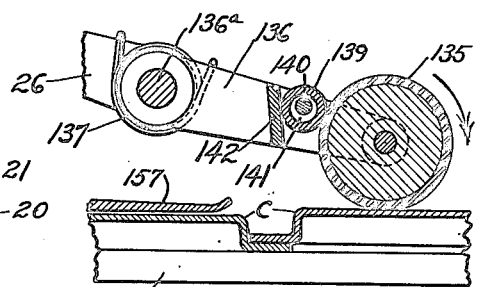

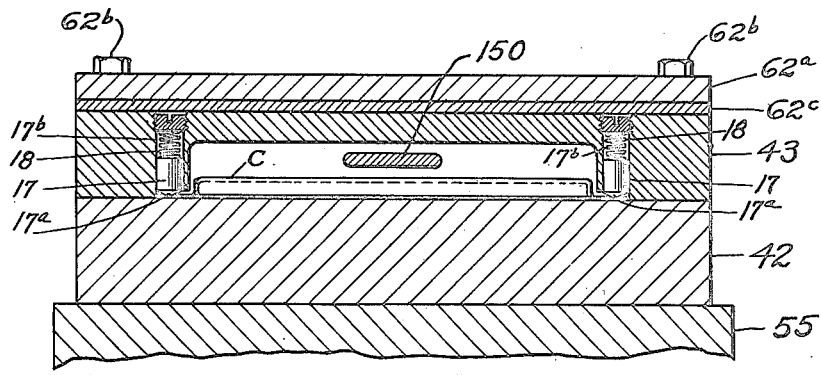
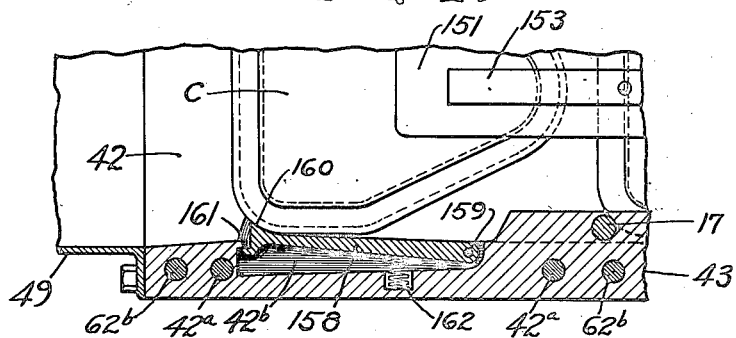
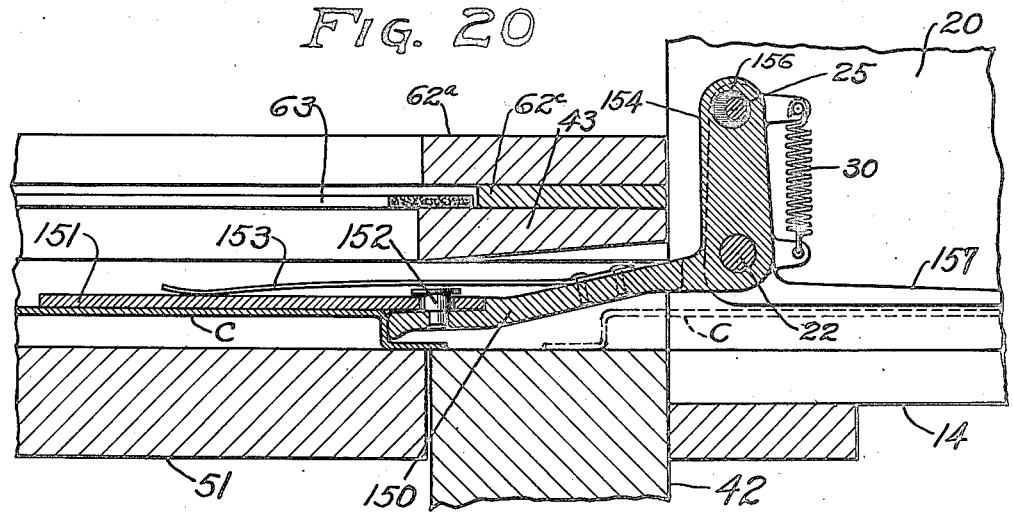

Patented Aug. 14, 1923.

1,465,101

UNITED STATES PATENT OFFICE.

WILLIAM J. TOWLE, OF ST. PAUL, MINNESOTA.

MACHINE FOR FORMING GASKETS AND APPLYING THE SAME TO CAN ENDS OR OTHER CLOSURES.

Application filed October 17, 1921. Serial No. 508,239.

*To all whom it may concern:*

Be it known that I, WILLIAM J. TOWLE, citizen of the United States, resident of St. Paul, in the county of Ramsey and State of Minnesota, have invented certain new and useful Improvements in Machines for Forming Gaskets and Applying the Same to Can Ends or Other Closures, of which the following is a specification.

This invention relates to improvements in means for cutting out paper gaskets preferably from rolls or sheets of paper and applying them to closures, such as sheet metal can ends, so that when said closures are united to the can bodies and sealed thereto, the joints between the can bodies and the closures are tight and non-leakable.

The invention consists generally in the constructions and combinations hereinafter described and particularly pointed out in the claims.

In the drawings forming part of this specification,

Figure 1 is a side elevation of a machine embodying my invention and arranged to cut paper gaskets from a roll of paper and to properly place them in can ends thereby preparing said can ends to be thereafter secured to can bodies with tight joints between said can ends and said can bodies, this figure of the drawings also showing in side elevation the machine by which the can ends are cut out of sheets of metal, and from which they are fed, preferably by gravity, to the machine forming the subject of the present invention.

Figure 2 is a section on line 2—2 of Figure 1, looking in the direction of the arrow, Figure 2ᴬ is a detail central section of the upper part of the machine showing the feed control drive connections, Figure 3 is a vertical section of the working element of the mechanism for bringing the gasket into cooperative relation with the can end.

Figure 4 is a detail section on line 4—4 of Figure 3,

Figure 5 is a detail section on an enlarged scale taken on the vertical plane of line 5—5 of Figure 3, the plane of the section following line 5—5 of Figures 9 and 12, Figures 5ᴬ and 5ᴮ are detail views illustrating the method of applying the gasket to the can ends.

Figure 6 is a plan view, showing the means for guiding the can ends to the position at which the gaskets are applied thereto.

Figure 7 is a transverse section on line 7—7 of Figure 6, looking in the direction of the arrow, Figure 8 is a detail section on line 8—8 of Figures 3 and 6, looking in the direction of the arrows, Figure 9 is an under side view of the carrying plate and dies, shown in Figure 5.

Figure 10 is a vertical section on line 10—10 of Figure 5,

Figure 11 is a partial plan view showing a modification of the means for positioning the can end in reference to the forming die.

Figure 12 is a plan view of the lower paper-cutting dies showing the plate supporting the same, Figure 13 is a plan of the gasket-forming strip of paper showing illustrations (at the left) of the partially cut gasket held in the sheet by narrow tongues or unsevered portions, showing in its third position the completely severed gasket, and in its last position (towards the right) the opening in the sheet from which the gasket has been removed.

Figure 14 is a plan view on the line 14—14 of Figure 15, similar to Figure 6, showing a preferred construction of the means for feeding and controlling the passage of the can ends to the forming die.

Figure 15 is a vertical section on the line 15—15 of Figure 14,

Figure 16 is a transverse section on the line 16—16 of Figure 15,

Figure 17 is a detail view on the line 17—17 of Figure 14,

Figure 18 is an enlarged section on the line 18—18 of Figure 14 illustrating means for ejecting the last can end from the forming die.

Figure 19 shows a modified preferred construction of means for controlling the can ends in the feed chute.

Figure 20 illustrates a modified preferred means for holding the can ends on the forming die.

In Figure 1 I have illustrated the machine of this invention and designated the same by the general reference letter A. I have also shown in Figure 1 and designated by the general reference letter B an associated machine by which the can ends, to which the gaskets are to be applied, are formed from suitable sheets of metal, said machine being provided with the forming and blanking dies 2, 3, reciprocating plunger or ram 4, drive pulley 5 and driving belt 6. This machine is also preferably provided with a sprocket wheel 7 and driving sprocket chain 8 by means of which power is communicated to the sprocket wheel 9 mounted on the eccentric or crank shaft $9^a$, actuating, by means of the connecting rod $9^c$, the plunger or ram $9^b$ of the machine A, which embodies my present invention. The machine is provided with a suitable base here shown as formed by a pair of standards 10 (Figure 2) having near their upper edges, grooves or ways 11 extending in the arc of a circle and supporting a base 12 having flanges 13 that fit into the ways 11. This permits the base 12 to be rocked or turned in the ways on the standard 10, thereby providing an adjustment of the angle of the face of the dies.

Similar means of adjustment are provided on the can end blanking and forming machine B. By adjusting these mechanisms the angle of the chute 14, leading from the can end blanking and forming machine B, to the gasket forming and inserting machine A, can be regulated.

As the can ends are formed by the machine B they slide downward in the chute 14, and are fed into position in the machine A to receive the gaskets that are formed and to have their edge turned upwards.

The chute 14 is preferably provided with the side rails 15 having the overhanging strips or ledges 16 arranged above the rails 15 forming grooves or recesses into which the surrounding flange of the can ends C project, (Figures 4 and 6), and which serve to keep said can ends in position in said chute.

The can ends for which the present machine is designed, are of the outline shown in Figure 6, and in cross section they have the inset or paneled form shown particularly in Figure 7. Said can ends pass by gravity down the inclined chute 14. The leading can end in the chute is held in a stationary position by conical stopping pins 17 controlled by springs 18 (Figure 8), and the leading can end in the chute is stopped by the pins 17 with its edge in contact with the conical ends $17^a$ of the pins.

Although the stopping pins 17 may be arranged in any suitable location, as in the lower die block 42 as shown in Figure 8, I prefer to locate them in the upper die block 43 in sockets $17^b$, as shown in Figure 19, for the reason that the can ends will not then be raised over the projecting ends of the pins in passing to the die, but will be held down to come in contact with and push out the finished can end from the die 42.

For positively feeding the leading can end from the chute 14 to the desired position in the die 42, where the can end receives the paper gasket and has its edge turned up, I provide a reciprocating slide 20 arranged in a grooved support 21 located alongside the lower portion of the chute 14 (Figures 3 and 4). This slide is provided with a pin or stud 22 projecting horizontally across the chute 14, and having pivotally supported thereon a yoke 23, preferably held in position on the pin 22 by collars 24, and carrying a pusher blade $24^a$. A stub pin 25 projects outwardly from the slide 20, having one end of a link 26 connected therewith, and held in position by a collar 27. The yoke has lugs 28 projecting upwardly on each side of the pin 25, and said lugs are provided with adjustable screws 29, the ends of which are in alinement with the stub pin 25. A spring 30 is connected to the yoke 23 and to a stationary lug on the slide 20. A stud 31 mounted in a standard 32 projecting upward preferably from the grooved support 21, carries the arm 33, the lower end of which is pivotally connected to the link 26, (Figure 3). The stud 31 is also provided with a crank arm 34 loosely mounted thereon, and the end of this crank is pivotally connected by means of a rod to a pivot block $35^a$ arranged preferably upon the reciprocating connecting rod $9^c$ (Figure $2^A$). The arm 33 is provided with a lug 37, and the crank arm with a lug 38, carrying a screw 39, which may be adjusted in said lug and the point of which is adapted to abut against the lug 37 on the arm 33. A spring 40 is connected to the crank arm 34 and to the arm 33 (Figure 3). As the slide reciprocates, the pusher blade $24^a$, and the yoke, move from the position shown by full lines at the left in Figure 3 to the position shown by dotted lines in the same figure, and the pusher blade $24^a$ yields slightly upward and passes over the can end that is nearest to the end of the chute 14. The upward movement of the connecting rod $9^c$ moves the slide 20, and the parts carried thereby, from the position shown in dotted lines in Figure 3 to the position shown by full lines in the same figure. By this means the can end that was formerly at the end of the chute and resting against the pins 17 is pushed forward into the position shown at the left in Figure 6, where it is brought into contact with the springs 41 (Figure 7) which hold said can end in proper position on the forming die 42, as hereinafter described.

It will be seen that as the can ends are forced out of the chute, by the pusher blade 24ª, their edges pass the pins 17, engaging the conical portions thereof, permitting the can end that is being actuated by the slide and pusher to be moved to the position shown at the left in Figure 6, while the next can end slides downward and forward against the pins 17, followed by the other can ends in the inclined chute 14, the edge of the forward flange of each can riding over or under the flange of the adjacent can end and the edge of the uppermost can end coming against the paneled or raised portion of the next can end as shown in Figure 6.
The can ends may be brought to exact position on the forming die 42, by the pusher blade 24ª with the curved lower corners of the can end resting against the inwardly curved ends 41ª of the flat springs 41. In order to exactly position the curved end of the springs 41 I provide a slight recess 42ᵇ in the top of the die block 42 (Figures 6 and 7) terminating on the inner sides in curved shoulders 44, against which the ends 41ª of the springs normally bear. In Figure 11 is illustrated a modified form of can end holder consisting of pins 45 slidingly mounted in the die 42, and provided with beveled or conical ends 46 and shoulders 47. Springs 48 hold the shoulders of the pins against the outer surface of the die, and the can end in position on the die rests against the beveled ends of the pins 45.

The chute 14 terminates at the edge of the block in which the forming die 42 is constructed (Figure 6) and guiding means on an upper die member 43, hereinafter described in detail, form continuations of the ledges 16 and serve to direct the can ends into proper position over the die 42.

In the operation of feeding the can ends into the machine, when a can end is pushed from its resting position in the chute 14 against the pins 17 to the position on the forming die 42, to receive a gasket and have the edge turned up, the incoming can end strikes the can end that has just been completed and forces this can end out from the die 42 and into a suitable discharge chute
49. By this action the curved ends 41ª of the springs 41 are forced outwards to let the broad portion of the can end pass, and immediately after this portion has passed, the springs 41 resume their original position before the incoming can end reaches the positioning ends of the springs. In the modified construction shown in Figure 11, the positioning pins 45 are forced outwards in their sockets, against the tension of the springs 48, when the can end is forced outwards, and the springs restore the pins to their normal position, against the shoulders 47, when the broad portion of the can end has passed. It will be seen that as the main connecting rod 9ᶜ raises during the operation of the machine A the pusher blade 24ª is simultaneously moved forward to place a can end on the die 42, and at the same time to discharge the completed can end, and as the rod drops the pusher blade moves backwards to engage the next can end. The upward swing of the pusher blade in passing backwards over the irregular surfaces of the can end is adjusted to proper limits by the screws 29, as will be seen in Figure 3.

The gasket is applied around the paneled or raised portion of the can end and a flange 50ª is turned up from the can end around the outer edge of the gasket after the gasket is applied as shown more particularly in Figure 5. The can end, before the flange 50ª is turned up, rests on the face of the die 42 (Figure 7), its edge 50, before forming the flange 50ª, overlapping the opening in the die, represented by the dotted line X in Figure 6, and full line X in Figure 7. A movable pressure plate 51 is supported in the forming die by means of guide pins 52, having shouldered heads 53, resting against the bottom of sockets 54 in the bolster plate 55, to which the die 42 is secured, preferably by suitable screws 56. A downwardly projecting threaded rod 57 is secured to the base plate 58 of the machine and passes loosely through a plate 59, below which it is provided with a coiled compression spring 60, held with an upward pressure against the plate 59 by means of a threaded nut 61. (See Figure 5.) Supporting pins 62 secured to the plate 59, pass up through holes in the base plate 58 and bolster plate 55, and rest against the under side of the pressure plate 51.

It will be seen by reference to Figures 3 and 5 that the tension of the spring 60 normally holds the pressure plate 51 in a predetermined position on the die 42, the guide pin shoulders 53 limiting the upward movement of the plate.

A stationary stripper plate 62ª is fastened on top of the die 43 by screws 62ᵇ and is slightly raised above the die by spacing blocks 62ᶜ to permit the strip of paper 63, from which the gaskets 64 are cut, to pass underneath.

Referring now to Figure 2, the strip of paper 63, is wound in the form of a paper roll around a spool or core 65, mounted rotatively upon a frame member 66, the spool 65 preferably being provided with a supporting disc 67. The paper strip is led from the paper roll around a spring tensioned roller 69, mounted in the extended frame 70, and from thence between suitable friction members and guides 71, feed rollers 72 and 73, to the gasket cutting die 74 (Figures 2 and 5). The lower and driving feed roll 72 is mounted in stationary bearings, preferably arranged upon the base 58 of the machine, and the upper pressure roller 73 is mounted in bearing blocks 75, arranged at both ends of the roller, and slidingly mounted upon vertical studs 76 provided with springs 77 exerting pressure on the paper strip between the rollers. The lower roll 72 is driven in the direction of the arrow by means of a suitable ratchet device 78 (Figure 1) which may be of any well known type and construction, and I have not, therefore, illustrated said device in detail.

The ratchet device 78 is driven by a suitable crank pin 68 arranged adjustably upon a disc 9$^e$ fastened to the crank shaft 9$^a$, and operates through a connecting rod 79 to turn the paper feed roller 72 only on the upstroke of the rod 79 and feed the paper strip the required distance. The length of the feed movement may be varied by adjusting the crank pin 68 towards or away from the center of rotation by any well-known means not illustrated in detail. On the down stroke of the rod 79 the feed rollers remain stationary, and the relative timing of the paper feed movement, and the operation of the punching and forming dies is adjusted so that the feed rollers are stationary while the punch and dies are in operative contact.

The paper cutting die 74 consists of a narrow irregularly curved die body of the width and contour of the gasket to be cut and provided with upper edges 81 and 82 (Figures 5 and 12). The die is supported on a base flange 83, by which it is secured to the bolster plate 55 by screws 84. The inner edge 81 at the cutting line, conforms substantially to the form of the raised or paneled portion of the can ends, and the cut off or waste section 85 of the paper strip is discharged downward through the cutting die 74. To facilitate the discharge I prefer to arrange a spring pressed push pin 85$^a$ having spiders 85$^b$ pushing the cut off section 85 below the cutting point. A stripper plate 86 is yieldingly supported on vertically sliding guide pins 87, its upper edge being normally held flush with the upper edge of the die 74, by means of shoulders 88 on the guide pins which are held against the terminal of the sockets 89 by coiled compression springs 90, arranged on the pins 87, between the bolster plate 55 and stripper plate 86. The paper strip is moved across the stripper plate 86, the upper surface of the cutting dies 74 and 43 by the feed rollers 72 and 73, and is guided in grooves 91 preferably formed at the die 74 by recessed plates 92 fastened to the movable stripper plate 86, as shown in Figures 3 and 10, and at the die 43 by the stationary stripper plate 62$^a$ and spacing blocks 62$^c$. The plates 92 abut the stripper plate 62$^a$ and blocks 62$^c$ thereby forming continuous grooves or guideways for the paper strip. The gaskets 64 are cut from the paper strip 63 during the last part of the down stroke of the plunger 9$^b$ which carries a plate 9$^d$ to which all the upper dies are secured (see Figures 5 and 9), and said gaskets are completely severed around their inner edge from the central blank portion by the cutting edge 94 of the die 96$^a$ co-acting with the cutting edge 81 of the die 74. The outer edge of the gasket is only partially severed from the paper strip 63 by the cutting edges 95 and 82 of dies 96 and 74 respectively for reasons which will hereinafter appear.

In the recess between the dies 96 and 96$^a$ into which the main body of the gasket enters after it has been partially cut, is arranged a stripper ring 97, the lower face of which is normally held flush with the cutting edges 94 and 95 by means of coil springs 98 acting to force the stripper ring shoulder 99 against a stop 100 in the die 96. The lower face of the stripper ring 97 is exactly of the form and contour of the gasket to be cut, and on the descent of the upper die to cut the gasket, the stripper ring contacts the paper for the gasket resting on the die 74 while the paper is cut, as shown in Figure 5, and on the ascent of the die the partially cut gasket is forced out of the recess by the pressure of the springs 98 against the ring 97. The opening formed in the gasket by the severance of the central blank portion 85 fits the paneled or raised portion of the can end around which the gasket is to be placed as will hereinafter appear. As the forming and inserting die members are removed some distance from the gasket cutting die, it is necessary to provide means for carrying the gasket to the forming and inserting die. For this reason I do not entirely sever the gasket from the paper strip 63, but provide a number of uncut sections 101, preferably five in number, in the outer edge of the gasket (see Figure 13) by cutting away corresponding portions 102 in the outer cutting edge 95 of the punch die 96, as indicated in Figures 5 and 9.

In order to obtain clean cuts of the paper at every point of the gasket and prevent possible tearing of the paper at the terminating points of the cuts at these uncut sections, I prefer to make slight outward slits 101$^{a'}$ at a sharp angle to the outer edge of the gasket at these points, and, for this purpose, outwardly projecting cutting lugs 74$^a$ are formed in the die 74, which co-operate with the edges 102$^a$ of the cutaway portions 102 of the punch die 96 to cut the slits 101$^a$. As seen in Figure 13 the paper strip 63 is slightly wider than the gaskets 64 and the partially severed gaskets will adhere to the strip by the uncut sections 101 until these sections are cut in the forming and inserting die as will be hereinafter described. This die is separated from the gasket cutting die as indicated in Figures 12 and 13, and the intervening space is occupied by a partially cut gasket during the simultaneous operation of cutting and inserting a gasket. The upper die block 103 carrying the die member 104, is secured by screws 105 to the plunger plate 9ᵈ. The die member 104 is secured to the die block 103 by screws 107 and 109 (see Figures 3 and 9), and it is recessed to receive a plate 108. A guiding stud 111 having a cap 112 and internally bored to receive a coiled spring 113 is secured to the plate 108. This stud is free to slide in the block 103 and its vertical movements are limited by the length of the socket 114 in which the cap 112 of the stud is engaged. A pin 115 having a head 116 projects through the lower end of the stud 111 and the spring 113 acts to force the pin downwards, the head 116 resting against the bottom of the bore and a plug 117 being screwed into the upper end of the bore against which the spring reacts. A knock-out pin 115ᵃ having a shouldered head 115ᵇ, normally resting in a socket in the screw 109 through which it passes, is preferably provided in the die block 103. A coil spring 115ᶜ keeps the pin 115ᵃ normally in the lowest position. The plate 108 carries a series of locating fingers 118 (see also Figure 9) pivoted to the plate 108, and normally held in a depending inwardly inclined position by springs 120 pressing against lugs 121 of the fingers as shown in Figure 3. The fingers 118 are provided with projections 118ᵃ (Figures 3 and 5ᴬ) which, when the fingers are brought in contact with the paneled edge of the can ends fit over the rounded edge, as shown in Figures 5 and 5ᴮ, and guide the gaskets readily over the panel of the can end. The springs 120 are preferably arranged in sockets in the plate 108 and press lightly against the lugs 121. Pins 122 having heads 123 are arranged in sockets 124 above the lugs 121 and are normally pressed downward by springs 125 to a position so that the lower ends of the pins are just above the lugs 121.

Referring again to Figures 2 and 12, the paper cutting die 43, above the forming die 42, is secured thereto by screws 42ᵃ and is provided with an opening 127 slightly larger than the outer circumference of the gasket 64. A series of cutting sections 128, corresponding in number and location to the uncut secions 101 of the gasket 64, project from the inner edge of the die body 43 into the opening 127. The cutting sections 128 may be made integral with the body of the die 126, or constructed as shown of separate blocks 129, of hard metal, grooved into the metal, composing the die-body, and fastened thereto preferably by screws 130.

In continuous operation the machines A and B operate at the same rate of speed and after the can ends have been blanked and partially formed in the machine B, as above described, they slide by gravity through the chute 24 to the machine A and are fed one by one upon the forming die 42 by each upward stroke of the plunger connecting rod 9ᶜ of the machine A. The strip of paper 63 is simultaneously advanced by the ratchet device 78 and feed rollers 72 and 73 and this movement is adjusted to place a partially cut gasket in position on the die 43 to be completely cut and inserted in the can end at this time having been brought to rest on the die 42. As the die 104 descends from the position shown in Figures 2 and 3 to that shown in Figure 5ᴬ the inwardly turned locating fingers 118 first enter the opening in the partially cut gasket 64. A moment before the die 104 contacts with the gasket 63 the pin 115 engages the raised portion of the can end, and the plate 108, normally resting by gravity on the collar or head 112 now remains stationary, supported on the can end by the pin 115 until contacted by the upper body of the die 104, the spring 113 being of sufficient tension to carry the plate 108.

As the die 104 descends the vertical pins 122 engage the lugs 121 of the locating fingers 118 to spread these fingers outwards to assume a vertical position, as shown in Figure 5ᴬ. This spreading movement has the effect of locating the partially cut gasket in an exact centralized position to be finally severed and affixed to the can end. The descending die then contacts the cutting sections 128 of the die member 43, and completely severs the gasket from the paper strip and then carries the gasket down towards the can end, the fingers 118 meanwhile keeping the inner edge of the gasket in alinement with the outer edge of the raised portion of the can end. By the further downward movement of the die 104, the springs 113 and 124 are compressed until the flat surface of the die strikes the plate 108 when the die will have pushed the gasket 64 off from the fingers 118 and around the raised portion of the can end as shown in Figure 5ᴮ. The fingers 118 will then bear on the upper face of the can end. The continued downward movement of the die 104 into the die 42 carrying the can end and gasket with it, turns upwards around the gasket the outer circumferential edge of the can end that was formerly overlapping the die 42, as illustrated in Figure 5. By this final movement the pressure plate 51 is also forced downward against the tension of the spring 60, and the gasket is pressed firmly to the bottom of the groove formed between the raised portion of the can end and its upturned edge, thereby firmly embedding the gasket in the completed can end secure against loss. When the die commences to move upwards, it is followed by the pressure plate 51 and the can end to its normal position, and the completed can end, resting on the pressure plate 51 is ready for ejection from the machine. Simultaneously with the foregoing operation of the forming and affixing dies, preliminary paper-cutting dies are being operated to form a partially cut gasket from the paper strip, and during the continued upward stroke of the upper die the completed can end is ejected from the machine, by a fresh can end being fed in place on the forming and affixing die, and a fresh partially cut gasket is moved in place over the can end, as heretofore described, thus making the machine automatic and continuous in operation.

In Figures 14 to 19 inclusive, I have shown a preferred form of mechanism for feeding the can ends to the forming and gasket affixing die. If the supply of can ends in the feeding chute run short, lessening the gravity pressure on the lower can ends, said can ends would occasionally slip backwards up the chute on the return movement of the pusher blade, thereby interfering with the proper working of the machine. Also if the supplying of can ends to the machine A for any reason should cease the last can end would remain on the forming die causing delay and possible injury to the can end and the machine. It has also been found that large sized can ends would occasionally be warped or distorted preventing their laying flat on the chute and interfering with their proper feeding to the machine. To properly handle can ends under such conditions I arrange a rail 134 in the chute 14 close above the can ends and about midway between the angle bars 15, to make the can ends lie flat and follow one another. A wheel 135, faced with rubber or other similar material, is mounted upon an arm 136, pivotally connected to the stud 136ª in the slide 20. A spring 137 attached to the arm 136 and link 26, tends to force the wheel 135 downwards upon the can ends. Means are provided whereby the wheel 135 is permitted to roll freely upon the top of the can ends on the backward and idle stroke of the slide 20, but which will lock the wheel against rotation on the forward feeding strokes. These means consist of a small roller 139, mounted upon a pin 140 arranged upon the arm 136 adjacent the wheel 135. The hole 141 in the roller is considerably larger than the pin 140 permitting a displacement of the roller upon the pin. A rib 142 having a slight incline from the vertical is provided on the arm 136 and the roller 139 is arranged in a wedge-shaped recess between the inclined face of the rib 142 and the face of the wheel 135. When the wheel 135 is moved backwards, rotating in the direction of the arrow, the roller 139 will be raised from active contact with the wheel 135 and the rib 142, permitting free rotation of the wheel, but when the wheel is subsequently moved forward on the feeding stroke and rotates in the opposite direction, the roller is wedged in the recess between the rib 142 and wheel 135, thereby effectually locking said wheel against rotation. On the backward travel of the wheel 135 the downward pressure of said wheel will press the can ends against the angle bars 15 on which they rest causing frictional resistance, and preventing any backward or upward movement of the can ends. During the forward travel, however, when the wheel 135 is blocked from rotating, the greater frictional resistance of the rubber face of the wheel will operate to move the can ends forward along with the wheel, and in this way act as a feeder to the pusher blade. As another precaution against backward slippage of the can ends, I mount a spring controlled latch 143 on a bar 144 underneath the can ends. The latch is pivoted to the bar 144 at 145 and is provided with a catch 146 normally projecting slightly above the bar 144 in the path of the can ends. A spring latch 147 holds the latch yieldingly against a stop 148. The catch 146 is located just back of the leading can end, positioned against the stop pins 17 in the die 43, preventing this can end from moving backwards. For the purpose of ejecting the last can end from the forming die, I provide the pusher blade 150 with an ejector blade 151 loosely connected to the pusher blade with a limited vertical movement, preferably by headed studs 152. The ejector blade 151 projects in front of the pusher blade 150 and rests normally on the top of the can ends, pressed downwards by a spring 153. If no can ends are present in the chute 14 to engage and eject the can end on the die, the ejector blade 151, at the completion of the backward stroke of the pusher blade will drop to engage the rear end of the said can end and eject it from the die during the forward stroke.

In the operation, briefly, sheets of metal, from which the can ends are to be formed, are fed to the forming and blanking devices of the machine B by which the can ends are cut out of the sheet and formed to the desired panel shape.

As hereinbefore described, the can ends slide by gravity from the machine B down the inclined chute to the gasket applying means, designated generally herein by the reference letter A.

As hereinbefore described the outer flat flanges of the can ends overlap as they pass down the chute. From the lower end of the chute the can ends are moved singly over the forming die, with the raised portion of the can end uppermost.

While the can ends are advancing towards the die 42 the gasket sheet is advanced by the feed rolls, and at the next downward movement of the ram or plunger the center of the gasket is cut out and discharged from the machine. At the same operation the gasket is severed from the sheet with the exception of the small uncut sections 101 which retain the gasket in the sheet, until it is completely severed therefrom, as hereinbefore described.

As the plunger continues to descend the gaskets are properly centered and placed in position around the raised or paneled portion of the can end, as heretofore described.

The further movement of the upper die turns the edge of the can end upward, thereby forming a groove, or recess in which the gasket is embedded. Each can end, after the gaskets are fixed therein, is fed out of the machine as hereinbefore described, and a new one is brought into position to be operated upon as before.

The sequence of movements of the can end feeding and gasket forming and applying means is co-ordinated to make the machine continuous and automatic in operation and one operator can readily take care of one or more pairs of the machines A and B, thereby effecting a great saving of labor over the usual methods. It will be understood that the paper or gasket cutting dies and the gasket applying and flange forming dies are proportioned so that the gasket covers the surface of the can end between the vertical wall of the panel and the up-turned edge 50$^a$, which gives a greater sealing surface than other gaskets, and as the gasket is pressed tightly against the can end when the edge is turned up, it practically becomes a part of the can end. The up-turned edge of the can end is preferably substantially at right angles to the flange of the can end, thereby leaving a full and free opening or groove for the flange of the can body to be more easily and quickly entered in the assembling operation. When the edge 50$^a$ of the can end is turned up it presses closely against the outer edge of the gasket, and the gasket is firmly embedded in the groove formed between the upturned edge of the can end and the substantially vertical wall of the panel. It is, therefore, extremely difficult for the gasket to become loosened or shaken out during the subsequent handling of the can end which has heretofore caused much trouble and waste when the gaskets are applied by other methods.

In place of the parts shown in Figure 3 for controlling the vertical play of the pusher blade I prefer the construction shown in Figures 16 and 18 where an arm 154 extends upward from the pusher blade 150 pivoted on the stud 22, and is provided with a large aperture 156 encircling the smaller stud 25 on the slide 20, as shown in Figure 18, whereby the swing of the pusher blade arm 154 is limited to the difference in diameters of the stud 25 and aperture 156. The pusher blade arm 154 is preferably split and a bar 157, projecting backwards to near the wheel 135, is supported upon the studs 22 and 25. This bar serves to prevent the can ends from overlapping or displacement during the feeding operation.

Another and preferred modified construction for adjusting the can ends on the forming die 42 is shown in Figure 20. A bar 158 is pivoted at each side of the die at 159 and is provided with inwardly curved ends 160 against which the can ends abut, and a stop lug 161. A spring 162 serves to hold the bar against the lug 161 in the normal position for retaining the can end. This device is equivalent to the devices for the same purpose above described, and it is clearly evident that other equivalents may be substituted.

While I have shown one particular form of closure and gasket therefor and have referred to the gaskets as being made of "paper" it will be understood that I do not limit myself to any particular form of closure or gasket or any particular material for said gaskets. Any suitable form and material may be employed for this purpose and will be understood as coming within the scope of the specification and claims. It will, therefore, be understood that the closures or ends and consequently the gaskets may be of any desired or preferred form or shape,—circular, oval, or rectangular, or of any desired irregular shape. It will also be understood that I do not limit myself to the particular details of construction shown and described but that various equivalent constructions and modifications of details may be made without departing from the principle and scope of the invention.

I claim as my invention:—

1. In a machine of the class described, the combination, with means for forming sheet metal closures, having flat edges or flanges, of means for cutting gaskets and applying the same to said closures, and means for thereafter turning up the edge of the closure around the outer edge of the gasket.

2. In a machine of the class described, the combination, with means for forming gaskets and applying the same to sheet metal closures having flat edges or flanges, of means for thereafter turning up the edge of the closure around the edge of the gasket.

3. In a machine of the class described, the combination, with means for forming sheet metal closures having flat edges or flanges, and means for feeding said closures successively to a gasket forming mechanism, of means for supporting a strip of gasket material, means for partially cutting a gasket from said strip, means for thereafter bringing the partially severed gasket over a closure, means for completely severing the gasket and applying it to the closure, and means for turning up the edge of the closure around the edge of the gasket.

4. In a machine of the class described, the combination, with means for forming can ends, having raised or paneled central portions and flat edges or flanges, of means for cutting gaskets and applying them to said can ends surrounding the paneled portions.

5. In a machine of the class described, the combination, with means for feeding can ends having raised or paneled central portions and flat edges, of means for cutting gaskets conforming in size and shape to the exterior of said panels, and means for applying said gaskets to said can ends around the panel walls.

6. In a machine of the class described, the combination, with means for feeding can ends having raised or paneled portions and flat edges, of means for cutting gaskets conforming in size and shape to the exterior of said panels, means for applying said gaskets to said can ends around the panel walls, and means for turning up the edge of the can end, and thereby forming with the panel walls a groove in which the gasket is securely seated.

7. In a machine of the class described, the combination, with means for producing can ends having paneled central portions formed by substantially vertical walls off-set from the can end, said walls being spaced from the edge of the can end, of means for forming a gasket and applying the same to the can end around the paneled walls, and means for turning up the edge of the can end and thereby forming with the panel walls a groove in which the gasket is seated.

8. In a machine of the class described, the combination, with means for feeding can ends, of a forming die, means for positioning the can end over said forming die, means for feeding a sheet of gasket material across a gasket cutting die positioned over and above said forming die, means for cutting a gasket from said material, and applying the same to the can end while in position upon said forming die, and means co-acting with said forming die for turning up the edge of the can end, and thereby forming a groove in which said gasket is securely seated.

9. In a machine of the class described, the combination, with means for feeding can ends, of a forming die, means for successively positioning the can ends over said forming die, means for feeding a sheet of gasket material across a gasket cutting die positioned over and above said forming die, and above the can end positioned thereon, means for cutting gaskets successively from said sheet of gasket material and placing the same upon the can end, and means co-acting with said forming die for turning up the edge of the can end and thereby forming a flange with which the outer edge of the gasket is in contact.

10. In a machine of the class described, the combination, with means for feeding can ends and positioning them over a forming die, of means for supporting and feeding a sheet of gasket material, means for cutting out the center and partially cutting the exterior of each gasket, means for thereafter bringing the partially severed gasket over the can end positioned upon said forming die, and means for completely severing the gasket from the gasket sheet and applying the same to said can end.

11. In a machine of the class described, the combination, with means for feeding can ends and positioning them over a forming die, of means for supporting and feeding a sheet of gasket material, means for cutting out the center and partially cutting the exterior of each gasket, means for bringing the partially severed gasket over the can end, means for completely severing the gasket from the gasket sheet and applying the same to said can end, and means for turning up the edge of the can end and forming a flange around the edge of the gasket positioned thereon.

12. In a machine of the class described, the combination, with means for feeding and positioning can ends, of means for feeding sheets of gasket material and cutting out from said material the centers and partially severing the exterior edges of the gaskets, means for thereafter bringing the partially severed gaskets over the positioned can ends, and means for completing the severing of said gaskets and applying the same to said can ends.

13. In a machine of the class described, the combination, with means for feeding sheets of gasket material, of means for cutting out, from said material, the centers and partially severing the exterior edges of gaskets, and means for thereafter, and by a separate operation, completing the severance of said gaskets.

14. In a machine of the class described, the combination with a forming die, and a spring supported pressure plate, of means for feeding a can end into position upon said plate, with its edge resting upon the surface of the die, means for forming a gasket and positioning the same over said can end, and means co-acting with said forming die for turning up the edge of said can end, and thereby forming a flange around the edge of said gasket.

15. In a machine of the class described, the combination with a forming die and a spring supported plate arranged within said die, of means for feeding a can end into position upon said plate with its edge resting upon the surface of the die, means for feeding a gasket sheet across said die, above the positioned can end, a plunger arranged above said forming die, provided with a co-operating die arranged to sever the gasket from said gasket sheet and to press it into position upon said can end, and means for actuating said plunger, the downward movement of said plunger and its die, within said forming die, causing the edge of said can end to be turned upward, forming a circumferential flange upon said can end in contact with the edge of said gasket.

16. In a machine of the class described, the combination, with a forming die, and means for feeding a sheet of gasket material across said die, said die being arranged to support a can end in position to receive a gasket formed from said sheet, of means for forming a gasket from said sheet and pressing it into position upon said can end, and thereafter depressing said can end, and causing its edge to be turned upward, by the forming die, into a flange around the edge of said gasket.

17. In a machine of the class described, the combination, with a forming die, and a spring supported plate arranged within said die, said plate being arranged to support a can end with its edge portion resting upon the surface of said forming die, means for feeding a gasket sheet across said die above the can end supported thereon, means for forcing a gasket cut from said sheet into position upon said can end, and means for depressing the plate and can end supported thereon, and causing the edge of the can end to be turned upward forming a flange surrounding said gasket.

18. In a machine of the class described, the combination, with a forming die, and means for feeding a sheet of gasket material across said die, said die being arranged to support a can end in position to receive a gasket formed from said sheet, of means for forming a gasket from said sheet and pressing it into position upon said can end and thereafter turning the edge of the can end to form a flange around the edge of said gasket.

19. In a machine of the class described, the combination, with a forming die and means for feeding a sheet of gasket material across a gasket cutting die positioned over and above said forming die, said forming die being arranged to support a can end in position to receive a gasket formed from said sheet, of means co-acting with said gasket cutting die for cutting a gasket from said sheet, and centering means engaging the inner edge of the gasket and guiding it into position upon said can end.

20. In a machine of the class described, the combination, with a forming die and means for feeding a sheet of gasket material across said die, said die being arranged to support a can end in position to receive a gasket formed from said sheet, of means for forming a gasket from said sheet, centering means engaging the inner edge of the gasket and guiding it into position upon said can end, and means for pressing said gasket into contact with said can end, and turning the edge of the can end upward to form a flange around the edge of said gasket.

21. In a machine of the class described, the combination, with means for successively feeding can ends or closures, of means for feeding a sheet of gasket material, means for cutting gaskets from said sheet, means engaging the inner edge of each gasket and directing the same into position upon a corresponding can end, and means for turning up the edge of each can end after a gasket has been positioned thereon, and forming a flange around the edge of said gasket.

22. In a machine of the class described, the combination, with a forming die, and a chute leading to said die, and arranged to guide said can ends or closures successively into position upon said die, of a reciprocating slide arranged in proximity to said chute, a pusher plate operated by said slide and arranged to engage successively the can ends in said chute and to move the lowermost one into operative position upon said forming die.

23. In a machine of the class described, the combination, with a forming die, of a chute leading to said die and arranged to guide can ends or closures successively into position upon said die, spring-controlled means arranged at the lower end of said chute for checking the movement of the lowermost can end in the chute, and means successively engaging the can ends in said chute and moving the lowermost can end into operative position upon said forming die.

24. In a machine of the class described, the combination, with a forming die, of a chute leading to said die, and arranged to guide can ends or closures successively into position upon said die, means co-acting with said forming die for forming a flange upon said can end, and means for ejecting from the machine the can end upon which the flange has been formed.

25. In a machine of the class described, the combination, with a forming die arranged to receive and hold can ends, of means for forming gaskets and positioning the same upon said can ends, means for forming a flange around the edge of each can end in contact with the outer edge of said gasket, and means for ejecting from said machine the can end that has been thus operated upon.

26. In a machine of the class described, the combination, with a stationary die, a reciprocating die and means for feeding a strip of paper between said dies, of inner and outer cutting edges in said dies for perforating and partially severing a gasket from said paper strip, a series of cut-away sections in the outer cutting edges in one of said dies, and a spring-pressed stripper ring movably arranged in the reciprocating die and contacting said gasket while it is being partially cut.

27. In a machine of the class described, the combination, with a stationary forming die and a reciprocating die operated by a plunger and co-acting with the stationary die, of a chute for delivering can ends or closures to be pushed in position on said stationary die, a reciprocating slide arranged in proximity to said chute, a rocker arm connected to said slide, connections between said slide, said rocker arm and said plunger whereby said slide is operated simultaneously with said plunger, a pusher plate pivotally connected to said slide and adapted to push one of said can ends to position on the stationary die at the forward stroke of said slide and means connected to said slide and including a roller for assisting the forward movement of the can ends and preventing backward movements of said can ends.

28. In a machine of the class described, the combination, with a stationary die, and means for positioning a can end upon said die, of a reciprocating die co-acting with said stationary die, a locating plate movably arranged in said reciprocating die, depending fingers arranged in said locating plate, means for bringing a perforated gasket in a position to pass said fingers through the perforation of said gasket when the reciprocating die descends, means operable in the reciprocating die to spread said fingers and position the gasket relative to the can end, forming means for thereafter affixing said gasket to said can end and pressure means arranged in the reciprocating die and acting on the can end while the gasket is being affixed.

29. In a machine of the class described, the combination, with a reciprocating plunger or ram, of upper cutting and affixing dies connected to said plunger, lower stationary dies arranged to co-act with said upper dies, rolls for feeding a strip of paper between said upper and said lower dies, a chute or feedway to which can ends or closures are delivered, reciprocating means connected to said plunger or ram, said means delivering one of said can ends or closures to the gasket affixing die on the upward stroke of the plunger and means co-operating with said dies for cutting a gasket from said strip of paper and affixing it to said can end or closure on the down strokes of said plunger.

30. In a machine of the class described, the combination, with a forming die, and a chute leading to said die, and arranged to deliver can ends or closures to be brought in position upon said die, of a reciprocating slide arranged in proximity to said chute, a pusher plate operated by said slide to push the can end nearest the die in position on said die, a yieldable spring controlled stop arranged in said die against which the can end is positioned when in place in the die, and means co-operating with said reciprocating slide and pusher blade for ejecting said can end from said die.

31. In a machine of the class described, the combination, with a forming die and a chute for delivering can ends to be pushed in position on said die, of a yieldable stop against which the can end in chute nearest to said die is arrested, a reciprocating member arranged in proximity to said chute, a pusher plate connected to said member and having a limited swinging movement, a shoulder on said pusher plate adapted to contact with and push the arrested can end nearest the die into position on said die thereby ejecting the can end in place on the die and a spring-pressed blade connected to said pusher blade and extending forward above said shoulder for ejecting the can end in place on the die when no can end is in the chute near the die.

In witness whereof, I have hereunto set my hand this 7th day of October, 1921.

WILLIAM J. TOWLE.